United States Patent [19]

Kuramoto et al.

[11] 4,426,482

[45] Jan. 17, 1984

[54] PROCESS FOR PRODUCING STABLE POLYMER EMULSIONS

[75] Inventors: Kenichi Kuramoto, Atsugi; Hideaki Nakazawa, Higashi Yamato, both of Japan

[73] Assignee: Toyo Soda Manufacturing Co., Ltd., Nanyo, Japan

[21] Appl. No.: 366,687

[22] Filed: Apr. 8, 1982

[30] Foreign Application Priority Data

Apr. 10, 1981 [JP] Japan .................................. 56-53232

[51] Int. Cl.$^3$ ..................... C08F 2/22; C08F 218/08; C08F 210/02; C08F 214/06
[52] U.S. Cl. .................................. 524/460; 524/458; 524/804; 524/812
[58] Field of Search ................ 524/460, 458, 804, 812

[56] References Cited

U.S. PATENT DOCUMENTS 3,640,922  2/1972  Sheetz .................................. 524/458

FOREIGN PATENT DOCUMENTS 47-606     1/1972   Japan .................................. 524/460
49-31280   3/1974   Japan .................................. 524/460
1488561   10/1977   United Kingdom ................ 524/460
2079760    1/1982   United Kingdom ................ 524/460

OTHER PUBLICATIONS

Chemical Abstracts, vol. 77, No. 2, Jul. 10, 1972, p. 56, Abstract 6516J.

*Primary Examiner*—Ronald W. Griffin
*Attorney, Agent, or Firm*—Cushman, Darby & Cushman

[57] ABSTRACT

An improved process for producing an aqueous polymer emulsion is provided wherein a radically polymerizable unsaturated monomer is polymerized in an aqueous medium in the presence of a water-soluble copolymer. The water-soluble copolymer is derived from a combination of (a) a nitrogen-containing ethylenically unsaturated compound with (b-1) an unsaturated carboxylic acid or its salt and/or (b-2) an ethylenically unsaturated sulfonic acid or its salt.

12 Claims, No Drawings

PROCESS FOR PRODUCING STABLE POLYMER EMULSIONS

BACKGROUND OF THE INVENTION

(1) Field of the Invention

This invention relates to a process for producing a stable aqueous polymer emulsion from a radically polymerizable monomer or monomers having an unsaturated bond. More particularly, this invention relates to a process for producing a stable aqueous polymer emulsion wherein a radically polymerizable monomer or monomers are polymerized in an aqueous medium in the presence of a water-soluble copolymer which is derived from a combination of (a) an ethylenically unsaturated nitrogen-containing compound with (b-1) an unsaturated carboxylic acid or its salt and/or (b-2) an ethylenically unsaturated sulfonic acid or its salt.

(2) Description of the Prior Art

Emulsion polymerization techniques have been popularly employed for the production of various industrially important polymers such as styrene-butadiene copolymer rubber, acrylonitrile-butadiene copolymer rubber, polystyrene, polychloroprene and styrene-acrylonitrile copolymer resins, and also for the production of various polymer emulsions used for paints and adhesives, such as acrylic polymer emulsions, vinyl acetate polymer emulsions and styrene-acrylic polymer emulsions. In conventional emulsion polymerization techniques, a monomer or monomers are dissolved or dispersed in water with one or more anionic, cationic or nonionic surface active agents, and polymerized by using a water-soluble or oil-soluble initiator.

The conventional emulsion polymerization techniques have some problems. For example, when a polymer is recovered from the reaction mixture, the emulsifier used remains partially in the polymer as an impurity and has a harmful influence on the polymer. For the production of polymer emulsions used for paints and adhesives, an emulsion stabilizer must be used in order to prevent or minimize the formation of coagulated products during the emulsion polymerization and to insure that the emulsion polymerization is stably carried out. It is desired that an emulsifier be used in a minimum amount so that the remaining emulsifier does not influence to a significant extent the performance of the polymer articles, such as films. Namely, when the polymer emulsion is used as a paint vehicle, bubbles are formed in the step of paint preparation and in the step of painting, which creates a problem in that it is very difficult to work with such a paint. If an antifoaming agent is incorporated in the polymer emulsion, which is a common procedure, the resulting polymer film becomes poor in water resistance and tends to blister. In an extreme case, when a salient amount of the emulsifier remains therein in the polymer emulsion, the coating or adhesive is re-emulsified upon contact with water.

In recent years, a polymer emulsion has been used as reinforcing materials for concrete. However, when the polymer emulsion is incorporated with a cement or mortar, bubbles tend to be formed due to the emulsifier. Furthermore, the polymer emulsion reacts with multivalent metal ions, such as $Ca^{++}$ and $Al^{+++}$, released from the cement or mortar and, consequently, the emulsion particles are coagulated, leading to the reduction in the strength of the resulting reinforced concrete structures.

In order to overcome the above-mentioned defects, some attempts have been proposed. For example, Japanese Patent Publication No. 6,392/1963 teaches that, when emulsion polymerization of acrylonitrile is effected in the presence of a water-soluble copolymer comprised of sodium vinyl benzene sulfonate and an unsaturated vinyl compound, instead of the conventional emulsifier, the rate of polymerization is enhanced and the slurry of the polymer becomes stable, because such a water-soluble copolymer exhibits a prominent emulsifying function. However, in this proposed technique, the allowable polymerization conditions are restricted, it is difficult to suppress the formation of coagulated products in the polymer emulsion and it is also difficult to obtain a polymer emulsion having a high concentration.

Japanese Patent Publication No. 606/1972 teaches the use of a styrene/methacrylic acid copolymer, a styrene/acrylonitrile/acrylic acid copolymer or a methyl acrylate/acrylic acid/itaconic acid copolymer instead of the conventional emulsifier in emulsion polymerization. However, it is still difficult to obtain a polymer emulsion having a high concentration as well as to suppress the formation of coagulated products in the polymer emulsion to the desired extent.

Furthermore, Japanese Patent Publication No. 31,280/1974 teaches the use of a sodium styrenesulfonate/methacrylic acid copolymer instead of the conventional emulsifier in emulsion polymerization. It is stated in this reference that the polymer particles in the resulting polymer emulsion are very fine. However, the polymer emulsions are liable to be easily destroyed by multivalent metal ions, particularly the aluminum ion. Also, the pH of the polymerization mixture is restricted to below 4.

SUMMARY OF THE INVENTION

A primary object of the present invention is to provide a process for producing an aqueous polymer emulsion from a radically polymerizable monomer or monomers, wherein the emulsion polymerization can be performed very stably, and the diameter of the polymer particles in the emulsion can be freely controlled.

Other objects and advantages of the present invention will be apparent from the following description.

In accordance with the present invention, there is provided an improved process for producing an aqueous polymer emulsion wherein a radically polymerizable monomer or monomers having an unsaturated bond are polymerized in an aqueous medium in the presence of a water-soluble copolymer. The water-soluble copolymer used is derived from a combination of (a) a nitrogen-containing compound having an ethylenically unsaturated bond with (b-1) an unsaturated carboxylic acid or its salt and/or (b-2) an ethylenically unsaturated sulfonic acid or its salt.

DESCRIPTION OF THE PREFERRED EMBODIMENTS

As the nitrogen-containing compound having an ethylenically unsaturated bond that is used for the preparation of the water-soluble copolymer, a compound represented by the following formula (I) or (II) is preferable:

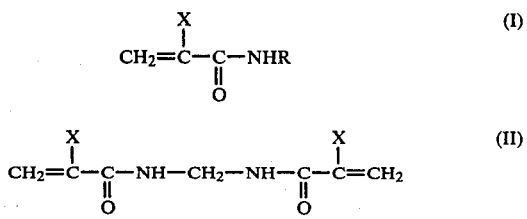

wherein X is a hydrogen atom or a methyl group and R is a hydrogen atom or a methylol group. The compound of the formula (I) or (II) includes acrylic amide, N-methylolacrylic amide, methylene-bis(acrylic amide), methacrylic amide, N-methylolmethacrylic amide and methylene-bis(methacrylic amide).

As the unsaturated carboxylic acid to be copolymerized with the above-mentioned nitrogen-containing compound, there can be mentioned those, which contain 3 to 8 carbon atoms, such as acrylic acid, crotonic acid, isocrotonic acid, vinylacetic acid, methacrylic acid, angelic acid, tiglic acid, allylacetic acid, maleic acid, fumaric acid, citraconic acid, methylfumaric acid, glutaconic acid, itaconic acid and allylmalonic acid. These unsaturated carboxylic acids may be used in the form of either a free acid or a salt such as a sodium, potassium or ammonium salt.

As the ethylenically unsaturated sulfonic acid to be copolymerized with the above-mentioned nitrogen-containing compound, there can be mentioned those, which contain 2 to 8 carbon atoms, such as, for example, vinylsulfonic acid, allylsulfonic acid, 2-methylallylsulfonic acid, styrenesulfonic acid, 2-sulfoethyl methacrylate, 2-sulfopropyl acrylate and 2-acrylamide-2-methylpropane-sulfonic acid. These sulfonic acids may also be used in the form of either a free acid or a salt such as a sodium, potassium or ammonium salt.

The radically polymerizable monomers having an unsaturated bond, used in the process of the present invention, are not particularly limited provided that they are capable of being polymerized by an emulsion polymerization procedure. Such radically polymerizable monomers include, for example, aromatic vinyl monomers, such as styrene, vinyltoluene, α-methylstyrene and chlorostyrene; conjugated diene monomers, such as butadiene, isoprene and chloroprene; acrylic and methacrylic acid esters, such as methyl acrylate, ethyl acrylate, butyl acrylate, methyl methacrylate, ethyl methacrylate and butyl methacrylate; vinyl and vinylidene halides, such as vinyl chloride, vinyl bromide, vinylidene chloride and vinylidene bromide; and vinyl esters, such as vinyl acetate and vinyl propionate. These radically polymerizable monomers may be used either alone or in combination.

The emulsion polymerization of the radically polymerizable monomers is effected by using an initiator. As the initiator used, there can be mentioned, for example, a persulfate, such as potassium persulfate, ammonium persulfate or sodium persulfate; a redox catalyst which is a combination of hydrogen peroxide, a water-soluble organic peroxide or a persulfate with a reducing sulfoxy compound and/or ferrous salt. Sulfoxylate initiator preparations and polyamine preparations, which are normally used for the preparation of synthetic rubbers, may also be used. The water-soluble initiators may be used either alone or in combination with an oil-soluble initiator.

The water-soluble copolymers used as an emulsifier or an emulsion polymerization stabilizer in the process of the present invention may be prepared as follows.

The water-soluble copolymer obtained from (a) a nitrogen-containing compound having an ethylenically unsaturated bond and (b-1) an unsaturated carboxylic acid or its salt is preferably prepared by polymerizing the monomers in an aqueous medium having a pH value of at least 3. Under such acidic conditions, an aqueous colorless transparent copolymer solution can be directly obtained.

Particularly, an aqueous copolymer solution prepared at a pH value of at least 4 is very advantageous in that the emulsion polymerization can be performed very stably and the formation of coagulated products can be minimized. Furthermore, the resulting polymer emulsion is also mechanically stable.

The water-soluble copolymer, derived from the combination of an ethylenically unsaturated nitrogen-containing compound with an unsaturated carboxylic acid or its salt, is an amphoteric polymeric material having a carboxylic group and an amino group in the molecule, and a polymer association appears among the polymers. Thus, an aqueous transparent solution of such a water-soluble copolymer may be advantageously prepared by polymerizing the monomers in an aqueous medium having a pH of at least 3. Alternatively, an aqueous transparent copolymer solution may be prepared by polymerizing the monomers in an aqueous medium having a pH below 3 and, thereafter, adding an alkali into the so obtained milky turbid solution having or not having a precipitate.

The proportion of (a) the ethylenically unsaturated nitrogen-containing compound to (b-1) the unsaturated carboxylic acid or its salt is not particularly limited. However, it is preferable that the amounts of (a) the ethylenically unsaturated nitrogen-containing compound and (b-1) the unsaturated carboxylic acid or its salt are 5 to 95% by weight and 95 to 5% by weight, respectively, based on the total weight of these compounds.

The water-soluble copolymer derived from (a) an ethylenically unsaturated nitrogen-containing compound and (b-2) an ethylenically unsaturated sulfonic acid or its salt can be prepared by polymerization in an aqueous medium at any pH value.

If it is intended that the resulting water-soluble copolymer be used for the preparation of an aqueous polymer emulsion having a low concentration, the proportion of (a) the ethylenically unsaturated nitrogen-containing compound to (b-2) the ethylenically unsaturated sulfonic acid or its salt is not particularly limited. However, if it is intended that the resulting water-soluble copolymer be used for the preparation of an aqueous polymer emulsion having a concentration of from 30 to 50% by weight, which is considered to be the most useful, it is preferable that the amounts of the monomer (a) and the monomer (b-2) be at least 40% by weight and not more than 60% by weight, respectively, based on the total weight of the monomers (a) and (b-2). More preferable amounts of the monomer (a) and the monomer (b) are in the ranges of from 45 to 95% by weight and from 5 to 55% by weight, respectively, based on the total weight of the monomers (a) and (b-2).

Using the above-mentioned water-soluble copolymer derived from the combination of the monomer (a) with the monomer (b-2), an emulsion polymerization of the present invention can be carried out stably at a desired pH value, for example, at a pH value of 10 to 11, when adjusted by the addition of an aqueous sodium hydroxide solution, or at a pH value below 4, when adjusted by the addition of an aqueous acetic acid solution. At a pH value below 4, the water-soluble copolymer derived from the combination of the monomer (a) with the monomer (b-2) is an amphoteric polymeric material having an anionic moiety and a cationic moiety, represented by the formula, for example:

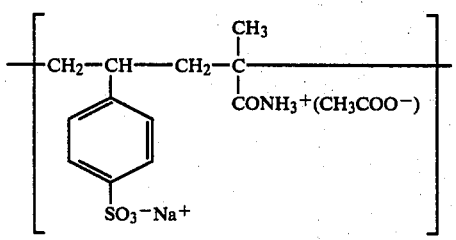

The water-soluble copolymer derived from the combination of the monomer (a) with the monomer (b-2) is advantageous particularly in that a polymer emulsion having a high concentration, i.e., of at least 50% by weight, can be easily obtained. The resulting polymer emulsion is very stable against multivalent metal ions such as, for example, $Ca^{++}$ and $Al^{+++}$.

The water-soluble copolymer derived from (a) an ethylenically unsaturated nitrogen-containing compound, (b-1) an unsaturated carboxylic acid or its salt, and (b-2) an ethylenically unsaturated sulfonic acid or its salt can also be prepared in a conventional manner. The proportion of the monomers (a), (b-1) and (b-2) is not particularly limited. That is, a polymer emulsion can be easily obtained by using the water-soluble copolymer of any monomer proportion. It is preferable, however, that the amount of the monomer (a) is in the range of 5 to 95% by weight, the amount of the monomer (b-1) is more than 5% by weight but less than 95% by weight and the amount of the monomer (b-2) is not more than 60% by weight, based on the total of the monomers (a), (b-1) and (b-2). More preferably, the amount of the monomer (b-2) is in the range of from 5 to 55% by weight based on the total of the monomers (a), (b-1) and (b-2).

The water-soluble copolymer derived from the combination of the monomers (a), (b-1) and (b-2) is advantageous in that the size of the polymer particles in the resulting polymer emulsion can be freely controlled. Accordingly, the viscosity of the polymer emulsion can be freely controlled. Therefore, if a water-soluble copolymer suitable particularly for the preparation of a polymer emulsion of a low viscosity is used, then a polymer emulsion having a very high concentration, i.e., of at least 50% by weight, can be easily prepared. For example, water-soluble sodium styrenesulfonate/methacrylic acid/methacrylic amide copolymer, wherein sodium styrenesulfonate and methacrylic acid are contained in higher proportions than that of methacrylic amide, results in a polymer emulsion having polymer particles of a small diameter. In contrast, if methacrylic amide is contained in a higher proportion than those of sodium styrenesulfonate and methacrylic acid in the water-soluble copolymer, the copolymer results in a polymer emulsion which has polymer particles of a large diameter and is stable against multivalent metal ions, and furthermore, a polymer emulsion of a high concentration can be easily obtained.

All of the above-mentioned water-soluble copolymers can be prepared by using an initiator which may be conventionally used in emulsion polymerization. Redox initiators are preferable. The redox initiators used are not particularly limited and include, for example, combinations of the following peroxides and reducing agents. That is, the peroxides include, for example, persulfates, such as potassium persulfate, sodium persulfate and ammonium persulfate; and hydroperoxides, such as hydrogenperoxide and t-butylhydroperoxide. The reducing agents include, for example, inorganic reducing agents, such as sodium hydrogensulfite, sodium thiosulfate, sodium metabisulfite and ferrous chloride; and organic reducing agents, such as alcohols, polyamines and Rongalit. If copolymerization for the preparation of the water-soluble copolymers is effected in an aqueous medium having incorporated therein an organic solvent, such as isopropyl alcohol or ethyl cellosolve, there can be used initiators which are conventionally used in the polymerization carried out in a non-aqueous medium. The amount of the initiator may be from 0.05 to 2% by weight based on the weight of the monomer.

It is possible to obtain directly by polymerization an aqueous copolymer solution having a concentration such that the solution can be used, as it is, for the emulsion polymerization, i.e., having a concentration of about 0.1 to about 10% by weight. Thus, it is possible to prepare the aqueous copolymer solution of such a concentration in a polymerization reactor and, further, incorporate a monomer or monomers into the copolymer solution for the emulsion polymerization. Alternatively, it is possible to prepare an aqueous copolymer solution having a high concentration and dilute the copolymer solution to the desired concentration for use in the emulsion polymerization.

The production of an aqueous polymer emulsion according to the present invention may be effected in the same manner as that employed in conventional emulsion polymerization processes, except that the above-mentioned water-soluble copolymer is used instead of a conventional emulsifier. The water-soluble copolymer has no emulsifying function, but exhibits a high surface tension. Thus, strictly speaking, the polymerization involved in the present invention may be called a soap-free polymerization rather than emulsion polymerization.

The amount of the water-soluble copolymer used is preferably in the range of from 0.1 to 10 parts by weight based on 100 parts by weight of the radically polymerizable unsaturated monomer. If the amount of the water-soluble copolymer is below 0.1 part by weight, the intended effect cannot be achieved. In contrast, the use of more than 10 parts by weight of the water-soluble copolymer is not advantageous when cost is considered.

If desired, in addition to the water-soluble copolymer, a surface active agent, in an amount of less than the critical micelle concentration, and/or a chain transfer agent may be used.

The advantages of the process of the present invention are summarized as follows.

First, the emulsion polymerization can be carried out very stably, even without the use of a conventional surface active agent. The amount of coagulated products formed in the resulting polymer emulsion can be minimized. Furthermore, the resulting polymer emulsion exhibits an excellent chemical stability, as compared with polymer emulsions obtained by using a conventional emulsifier or another similar water-soluble copolymer. Namely, the polymer emulsion is very stable against electrolytes and polyvalent metals, such as $Al^{+++}$ and $Ca^{++}$. Therefore, the polymer emulsion is useful as a reinforcing material incorporated in cements or mortars.

Secondly, the diameter of polymer particles in the polymer emulsion can be freely controlled. Namely, if a terpolymer derived from the above-mentioned monomers (a), (b-1) and (b-2) is used as the water-soluble copolymer, polymer particles of a small diameter or a large diameter can be obtained. When the polymer particles are large, the viscosity of the polymer emulsion is low and, therefore, the polymer emulsion can be of a high concentration, e.g., of at least 50% by weight, and the polymer can be recovered easily from the polymer solution. Accordingly, the polymer emulsion obtained by the process of the present invention is suitable for coating materials, such as paints and adhesives. This is because an aqueous polymer emulsion of a high concentration, i.e., a high solid content, is very desirable in order to save both energy and material in this industry of coating materials, which includes such items as paints and adhesives.

Thirdly, the polymer emulsion exhibits a relatively high surface tension and a reduced foaming property. Even if the emulsion forms, it can be readily defoamed. This is because the water-soluble copolymer has a reduced function as a surface active agent.

Fourthly, the polymer emulsion results in cast films or coatings which are advantageous over cast films or coatings prepared from polymer emulsions using a conventional emulsifier. That is, the former films or coatings are superior in water resistance, film-forming property, transparency, elongation at break, toughness and hysteresis loop in the stress-strain curve in tension.

Fifthly, the polymer particles of the polymer emulsion are of a structure such that they are coated with the water-soluble copolymer and, therefore, the polymer emulsion exhibits some advantageous properties due to the polar groups of the water-soluble copolymer. For example, when the polymer emulsion is used as a textile treating agent, the treated textile exhibits a good feel. When the emulsion is used as an adhesive, an enhanced adhesion can be obtained.

The polymer emulsions prepared by the process of the present invention are useful in, for example, water paints, adhesives, textile treating agents, paper treating agents, reinforcing material for concrete and binders for nonwoven fabrics.

The invention will be further illustrated by the following examples wherein parts and percents are by weight unless otherwise specified.

EXAMPLE 1

After being flushed with nitrogen, a reactor was charged with 191 parts of deionized water, 1.2 parts (in terms of the pure compound) of sodium styrenesulfonate and 2.8 parts of methacrylic amide. The content was heated to 80° C. while being stirred. When the temperature reached 80° C., 10 parts of an aqueous 5% sodium persulfate solution were added to the contents to effect polymerization. The polymerization was continued over a period of one hour to obtain an aqueous 2% copolymer solution.

100 parts of ethyl acrylate and 100 parts of methyl methacrylate were mixed together and then the monomeric mixture was added drop by drop at a constant rate to the above-mentioned copolymer solution over a period of 3 hours while being stirred. After completion of the addition of the monomeric mixture, the stirring was continued further for one hour, thereby completing polymerization. The copolymer emulsion, so obtained, was cooled and then filtered by using a stainless steel net having a size of 10 mesh to obtain the copolymer emulsion I.

Following the same procedure as that mentioned above, copolymer emulsions II and III were prepared, wherein a monomeric mixture (for copolymer emulsion II) of 120 parts of ethyl acrylate and 120 parts of methyl methacrylate and a monomeric mixture (for copolymer emulsion III) of 148 parts of ethyl acrylate and 148 parts of methyl methacrylate were separately polymerized in the same sodium styrenesulfonate/methacrylic amide copolymer solution as mentioned above. All other conditions remained substantially the same.

Characteristics of the resultant copolymer emulsions are shown in Table I, below.

TABLE I

| Run | I | II | III | Comp. Ex.*1 |
|---|---|---|---|---|
| Coagulated product (% based on monomer) | 0.075 | 0.021 | 0.084 | 0.42 |
| Emulsion concentration (%) | 50.5 | 55.0 | 60.6 | 50.4 |
| Viscosity (cps, 23° C.)*2 | 65 | 133 | 1,270 | — |
| Particle diameter $(\mu)$*3 | 0.7 | 0.7 | 0.7 | — |
| Chemical stability against $Al^{+++}$ (ml)*4 | 50 | 50 | 50 | 3 |

*1Comparative Example
A monomeric mixture of 100 parts of ethyl acrylate and 100 parts of methyl methacrylate was polymerized in a similar manner in an aqueous copolymer solution, which was obtained by copolymerizing sodium styrenesulfonate with methacrylic acid instead of methacrylic amide.
*2Measured by using Brookfield type viscometer supplied by Tokoyo Keiki K.K.
*3Measured by using Coulter Counter model TA II, supplied by Coulter Electronics, Inc.
*4Each emulsion was diluted 100 times with deionized water. An aqueous 10% aluminum sulfate solution was added dropwise to 50 ml of the diluted emulsion. The stability of the emulsion against aluminum ion is expressed by the minimum amount of the aluminum sulfate solution necessary to flocculate the emulsion.

EXAMPLE 2

Each of the monomeric compositions, listed in Table II below, was diluted in 191 parts of deionized water, and, then, an aqueous copolymer solution was prepared therefrom in the same manner as mentioned in Example 1.

TABLE II

| Run | I | II | III | IV |
|---|---|---|---|---|
| Sodium styrenesulfonate (NaSS) | 0.4 | 1.2 | 2.0 | 2.4 |
| Methacrylic amide (MAm) | 3.6 | 2.8 | 2.0 | 1.6 |
| NaSS/MAm ratio | 1/9 | 3/7 | 5/5 | 6/4 |

A monomeric mixture of 100 parts of ethyl acrylate and 100 parts of methyl methacrylate was polymerized using the above-mentioned aqueous copolymer solution in the same manner as mentioned in Example 1.

Characteristics of the resultant copolymer emulsions are shown in Table III, below.

TABLE III

| Run | I | II | III | IV |
|---|---|---|---|---|
| Coagulated product (% based on monomer) | 0.07 | 0.073 | 0.065 | 1.67 |
| Emulsion concentration (%) | 50.1 | 50.3 | 50.5 | 50.5 |

TABLE III-continued

| Run | I | II | III | IV |
|---|---|---|---|---|
| Viscosity (cps, 23° C.) | 63 | 65 | 70 | 96 |
| Particle diameter (μ)*1 | 0.7 | 0.7 | 0.7 | 0.6 |

*Measured in the same manner as in Example 1.

EXAMPLE 3

Following the same procedure as that mentioned in Example 1, a monomeric mixture of styrene/n-butyl acrylate/methacrylic acid was polymerized in an aqueous sodium styrenesulfonate/methacrylic amide copolymer solution. The materials used are shown in the following list.

| Material | Amount (parts) |
|---|---|
| Deionized water | 185 |
| Sodium styrenesulfonate (in terms of the pure compound) | 1.2 |
| Methacrylic acid | 2.8 |
| Sodium persulfate, aqueous 5% solution | 20.0 |
| Styrene | 107.6 |
| n-Butyl acrylate | 90.0 |
| Methacrylic acid | 2.4 |

Characteristics of the resultant copolymer emulsion are shown in Table IV, below.

TABLE IV

| Coagulated product (% based on monomer) | 0.075 |
|---|---|
| Emulsion concentration (%) | 50.1 |
| Viscosity (cps, 23° C.) | 175 |
| Particle diameter (μ)*1 | 0.6 |

*Measured in the same manner as in Example 1.

EXAMPLE 4

After being flushed with nitrogen, a reactor was charged with a solution of 0.739 part of Rongalit and 0.0018 part of ferrous sulfate (FeSO$_4$7H$_2$O) in 60 parts of degassed and deionized water. 18.0 parts of sodium styrenesulfonate, 18.0 parts of methacrylic amide and 24.0 parts of acrylic amide were dissolved in 120 parts of degassed and deionized water to prepare an aqueous monomer solution. 0.78 part of ammonium persulfate was dissolved in 60 parts of degassed and deionized water to prepare an aqueous initiator solution.

The content in the reactor was heated to 60° C. and, the above-mentioned monomer solution and the initiator solution were added dropwise into the reactor at that temperature while the content was stirred. Thus, polymerization was carried out at 60° C. for two hours and stirring was further continued until the polymerization was completed. The resultant polymerization mixture was cooled to obtain an aqueous 20% copolymer solution.

A reactor was charged with 20 parts of the above-mentioned aqueous 20% copolymer solution, 160 parts of degrassed and deionized water and 10 parts of an aqueous 2% sodium hydrogencarbonate solution, and the content was mixed uniformly by stirring. Then, 20 parts of vinyl acetate were added into the reactor. The content was heated to 65° C. and 20 parts of an aqueous 3% potassium persulfate solution were added to the content. After the reaction mixture became turbid and the exothermic peak was reached, 180 parts of vinyl acetate were added dropwise thereto at a constant rate over a period of 3 hours. After completion of the addition, the reaction mixture was stirred further for one hour and then cooled. Thereafter, the reaction mixture was filtered by using a stainless steel net having a size of 100 mesh, and the amount of the coagulated product was determined.

Characteristics of the resultant polyvinyl acetate emulsion and the film prepared therefrom are shown in Table V, below.

TABLE V

| | Example 4 | Comp. Example*1 |
|---|---|---|
| Coagulated product (% based on monomer) | 0.02 | 0.01 |
| Emulsion concentration (%) | 49.8 | 49.6 |
| Viscosity (cps, 23° C.) | 20 | 99 |
| Particle diameter (mμ)*2 | 250 | 90 |
| Chemical stability (ml)*3 | | |
| against Al$^{+++}$ | >50 | <1 |
| against Ca$^{++}$ | >50 | <1 |
| Water absorption (%)*4 | 40 | 170 |

*1Comparative Example
Using 2 parts, based on 100 parts of the monomer, of a commercially available surface active agent (monoalkyl sulfosuccinic acid salt) in place of the water-soluble copolymer, vinyl acetate was emulsion-polymerized in a manner similar to that mentioned above.
*2The particle diameter was determined according to a light scattering method. The particle diameters occurring in the following tables were determined in the same manner.
*3The chemical stability was determined in the same manner as mentioned in Example 1 except that calcium chloride was used instead of aluminum sulfate for the determination of the chemical stability against Ca$^{++}$.
*4Each copolymer emulsion was cast into a film having a thickness of 0.2 mm. The water absorption test was carried out by immersing the film in distilled water maintained at 22° C. for 72 hours, and the water absorption was determined according to the gravimetric thickness.

EXAMPLE 5

Following the same procedure as that mentioned in Example 4, an aqueous 20% copolymer solution was prepared wherein 240 parts of degassed and deionized water, 18 parts of sodium styrenesulfonate, 12 parts of sodium vinylsulfonate, 30 parts of methacrylic amide, 1.278 parts of sodium metabisulfite and 1.278 parts of ammonium persulfate were used. All other conditions remained substantially the same.

Following the same procedure as that mentioned in Example 1, a monomeric mixture of 100 parts of n-butyl acrylate and 100 parts of methyl methacrylate was polymerized using 20 parts of the above-mentioned aqueous 20% copolymer solution.

Characteristics of the resultant n-butyl acrylate/methyl methacrylate copolymer emulsion are shown in Table VI, below.

TABLE VI

| Coagulated product (% based on monomer) | 0.08 |
|---|---|
| Emulsion concentration (%) | 50.5 |
| Viscosity (cps, 23° C.) | 35 |
| Particle diameter (mμ) | 150 |
| Chemical stability (ml) | |
| Al$^{+++}$ | 50 |
| Ca$^{++}$ | 50 |

EXAMPLE 6

An aqueous methacrylic amide/methacrylic acid copolymer solution was prepared by using 269 parts of degassed and deionized water, 15 parts of methacrylic amide, 15 parts of methacrylic acid, 0.64 part of ammonium persulfate and 5.4 parts of sodium hydroxide. That is, a reactor was charged with an aqueous sodium hydroxide solution. An aqueous monomer mixture (methacrylic amide/methacrylic acid) solution and an aqueous ammonium persulfate solution were added dropwise at 90° C. to the aqueous sodium hydroxide solution over a period of 2 hours while being stirred. After completion of the addition, stirring was continued until the polymerization was completed. The resultant aqueous copolymer solution had a concentration of 11.5%, a pH value of 6.0, a molecular weight of $4.2 \times 10^4$ and a viscosity of 7 cps.

The above-mentioned procedure was repeated, wherein the amount of sodium hydroxide used was varied, to obtain four aqueous copolymer emulsions having pH values of 4.0, 5.0, 8.0 and 9.5.

Following the same procedure as mentioned in Example 1, a monomeric mixture of 100 parts of ethyl acrylate and 100 parts of methyl methacrylate was polymerized using 40 parts of each of the above-mentioned aqueous copolymer solutions.

Characteristics of the resultant ethyl acrylate/methyl methacrylate copolymer emulsion are shown in Table VII, below.

TABLE VII

| Run | I | II | III | IV | V |
|---|---|---|---|---|---|
| pH of aq. copolymer solution | 4.0 | 5.0 | 6.0 | 8.0 | 9.5 |
| Coagulated product (% based on monomer) | 0.47 | 0.03 | 0.04 | 0.10 | 0.15 |
| Emulsion concentration (%) | 49.9 | 50.3 | 50.2 | 50.3 | 50.2 |
| pH of emulsion | 5.0 | 5.5 | 6.8 | 7.8 | 7.4 |
| Viscosity (cps, 23° C.) | 3,600 | 200 | 300 | 700 | 1,100 |
| Particle diameter (mμ) | 220 | 190 | 130 | 100 | 90 |

Characteristics of the film cast from the copolymer emulsion of Run No. III are shown in Table XI, below.

EXAMPLE 7

Following the same procedure as that mentioned in Example 6, four aqueous copolymer emulsions were prepared from the following monomer compositions:

(I) 28.5 parts of methacrylic amide and 1.5 parts of methacrylic acid;

(II) 21 parts of methacrylic amide and 9 parts of methacrylic acid;

(III) 9 parts of methacrylic amide and 21 parts of methacrylic acid; and (IV) 1.5 parts of methacrylic amide and 28.5 parts of methacrylic acid. The amount of degassed and deionized water was 104 parts and the amount of sodium hydroxide was (I) 0.002, (II) 3.15, (III) 7.35 and (IV) 10.5 parts, respectively. All other conditions remained substantially the same. The resultant four copolymer solutions had the same pH of 6.0, but different compositions.

Following the same procedure as that mentioned in Example 1, a monomeric mixture of 100 parts of ethyl acrylate and 100 parts of methyl methacrylate was polymerized using 40 parts of each of the above-mentioned aqueous copolymer solutions.

Characteristics of the resultant copolymer emulsions are shown in Table VIII, below.

TABLE VIII

| | I | II | III | IV |
|---|---|---|---|---|
| Methacrylic amide/methacrylic acid ratio | 95/5 | 70/30 | 30/70 | 5/95 |
| pH of aq. copolymer emulsion | 6.0 | 6.0 | 6.0 | 6.0 |
| Coagulated product (% based on monomer) | 0.20 | 0.06 | 0.09 | 0.09 |
| Emulsion concentration (%) | 49.5 | 50.1 | 50.1 | 50.2 |
| Viscosity (cps, 23° C.) | 50 | 300 | 950 | 980 |

TABLE VIII-continued

| | I | II | III | IV |
|---|---|---|---|---|
| Particle diameter (mμ) | 190 | 150 | 130 | 125 |

EXAMPLE 8

Following the same procedure as that mentioned in Example 6, an aqueous acrylic amide/methacrylic acid copolymer solution was prepared wherein 9 parts of acrylic amide, 21 parts of methacrylic acid and 7.4 parts of sodium hydroxide were used with all other conditions remaining substantially the same.

Following the same procedure as that mentioned in Example 1, a monomeric mixture of 100 parts of styrene and 100 parts of n-butyl acrylate was polymerized using 40 parts of the above-mentioned aqueous acrylic amide/methacrylic acid copolymer solution.

Characteristics of the resultant copolymer emulsion are shown in Table IX, below.

TABLE IX

| Coagulated product (% based on monomer) | 0.07 |
|---|---|
| Emulsion concentration (%) | 50.0 |
| Viscosity (cps, 23° C.) | 90 |
| Particle diameter (mμ) | 180 |

EXAMPLE 9

Following the same procedure as those mentioned in Examples 4 and 6, an aqueous methacrylic amide/methacrylic acid copolymer solution was prepared wherein 269 parts of degassed and deionized water, 15 parts of methacrylic amide, 15 parts of methacrylic acid, 0.64 part of sodium thiosulfate, 0.64 part of sodium persulfate and 4.7 parts of sodium hydroxide were used with all other conditions remaining substantially the same.

Following the same procedure as that mentioned in Example 4, vinyl acetate was polymerized using 40 parts of the above-mentioned methacrylic amide/methacrylic acid copolymer solution.

Characteristics of the resultant polyvinyl acetate emulsion and the film cast therefrom are shown in Tables X and XI, below.

TABLE X

| Coagulated product (% based on monomer) | 0.15 |
|---|---|
| Emulsion concentration (%) | 48.5 |
| Viscosity (cps, 23° C.) | 40 |
| Particle diameter (mμ) | 250 |

TABLE XI

| | Example 6, Run III | Comp. Example[*1] | Example 9 | Comp. Example[*1] |
|---|---|---|---|---|
| Polymer emulsion | Ethyl acrylate/methyl methacrylate copolymer | | Polyvinyl acetate | |
| Tensile properties[*2] | | | | |
| Elongation (%) | 300 | 348 | 0 | 0 |
| Strength at break (kg/cm$^2$) | 178 | 134 | 130 | 107 |
| Light transmittance (%)[*3] | 92 | 92 | 78 | 70 |
| Water absorption (%)[*4] | | | | |
| after 24 hours | 7 | 10 | 28 | 92 |
| after 48 hours | 10 | 16 | 32 | 130 |

TABLE XI-continued

| | Example 6, Run III | Comp. Example*¹ | Example 9 | Comp. Example*¹ |
|---|---|---|---|---|
| after 72 hours | 13 | 21 | 38 | 158 |

*¹Comparative Examples
The emulsion polymerization was carried out by using a commercially available surface active agent (monoalkyl sulfosuccinic acid salt) instead of the aqueous methacrylic amide/methacrylic acid copolymer solution.
*²Tensile properties
A film specimen was prepared by casting the (co) polymer emulsion into a film of a 0.2 mm thickness and punching out the film by using a No. 4 dumbell die. Elongation and strength at break were determined by using an Autograph 1S-10T (supplied by Shimazu Seisaku Sho) at 23 ± 1° C. and at a cross-head speed of 500 mm/min.
*³Light transmittance at wave lengths of 340–700 mµ was determined on a film specimen of a 0.2 mm thickness by using a Hitachi spectrometer EPS-3T.
*⁴A film specimen having a size of 2 × 2 cm² and a thickness of 0.2 mm was immersed in distilled water at 23 ± 1° C. The increase in weight with time was measured.

EXAMPLE 10

Following the same procedure as those mentioned in Examples 4 and 6, an aqueous 2-acrylamide-2-methylpropanesulfonic acid/methacrylic acid/methacrylic amide copolymer solution was prepared wherein the following materials were used.

| Materials | Parts |
|---|---|
| Degassed and deionized water | 270 |
| Ammonium persulfate | 0.63 |
| Sodium metabisulfite | 0.63 |
| Sodium hydroxide | 0.46 |
| 2-acrylamide-2-methylpropanesulfonic acid | 6 |
| Methacrylic acid | 15 |
| Methacrylic amide | 9 |

Sodium hydroxide was charged in a reactor together with degassed and deionized water and sodium metabisulfite. All other conditions remained substantially the same.

Following the same procedure as that mentioned in Example 1, a monomeric mixture of 100 parts of styrene and 100 parts of n-butyl acrylate was polymerized using 40 parts of the above-mentioned aqueous copolymer solution.

Characteristics of the resultant copolymer emulsion are shown in Table XII, below.

TABLE XII

| Coagulated product (% based on monomer) | 0.19 |
|---|---|
| Emulsion concentration (%) | 50.5 |
| Viscosity (cps, 23° C.) | 720 |
| Particle diameter (mµ) | 190 |

EXAMPLE 11

Following the same procedure as that mentioned in Example 11, an aqueous 10% copolymer solution was prepared wherein a monomeric mixture of 6 parts of sodium styrene-sulfonate, 15 parts of methacrylic acid and 9 parts of methacrylic amide was used.

Then, a reactor was charged with 40 parts of the above-mentioned copolymer solution, 197 parts of degassed and deionized water and 1.0 part of sodium hydrogensulfite. 1.0% of a mixture of 180 parts of vinylidene chloride and 20 parts of ethyl acrylate was added into the reactor. Then, the content was heated to 30° C. while being stirred, and 2 parts of an aqueous 5% ammonium persulfate solution were added thereto to initiate polymerization. After the reaction mixture became turbid and the exothermic peak was reached, the remaining monomer mixture and 18 parts of an aqueous 5% ammonium persulfate solution were added dropwise at a constant rate to the reaction mixture over a period of 3 hours. After completion of the addition, the reaction mixture was stirred further for one hour, thereby completing polymerization. Thereafter, the reaction mixture was cooled and, then, filtered by using a stainless steel net having a size of 100 mesh and the amount of the coagulated product was determined.

Characteristics of the resultant vinylidene chloride-/ethyl acrylate copolymer emulsion are shown in Table XIII, below.

TABLE XIII

| Coagulated product (% based on monomer) | 0.1 |
|---|---|
| Emulsion concentration (%) | 45.1 |
| Viscosity (cps, 23° C.) | 200 |
| Particle diameter (mµ) | 130 |

EXAMPLE 12

Following the same procedure as that mentioned in Example 6, an aqueous copolymer solution was prepared wherein 6 parts of sodium styrenesulfonate, 12 parts of methacrylic acid, 12 parts of methacrylic acid and 0.63 parts of ammonium persulfate were used. After the completion of polymerization, 4.3 parts of sodium hydroxide were added to the polymerization mixture to obtain a colorless, transparent copolymer solution.

Following the same procedure as that mentioned in Example 1, a monomeric mixture of 100 parts of n-butyl acrylate and 100 parts of methyl methacrylate was polymerized using 40 parts of the above-mentioned copolymer solution.

Characteristics of the resultant copolymer emulsion are shown in Table XIV, below.

TABLE XIV

| Coagulated product (% based on monomer) | 0.08 |
|---|---|
| Emulsion concentration (%) | 50.1 |
| Viscosity (cps, 23° C.) | 350 |
| Particle diameter (mµ) | 120 |

We claim:

1. A process for producing an aqueous polymer emulsion wherein a radically polymerizable monomer or monomers having an unsaturated bond are polymerized in an aqueous medium in the presence of a water-soluble copolymer, said process comprising using as the water-soluble copolymer a copolymer derived from a combination of:

(a) a nitrogen-containing compound having an ethylenically unsaturated bond represented by the formula (I) or (II):

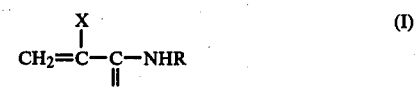

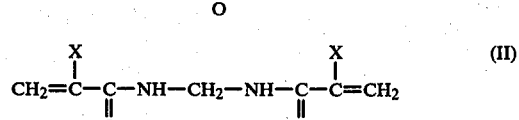

wherein X is a hydrogen atom or a methyl group and R is a hydrogen atom or a methylol group, with at least one compound selected from the group consisting of
(b-1) an unsaturated carboxylic acid or its salt, and
(b-2) an ethylenically unsaturated sulfonic acid or its salt.

2. A process according to claim 1 wherein the water-soluble copolymer is derived from (a) 5 to 95% by weight of a nitrogen-containing compound having an ethylenically unsaturated bond with (b-1) 5 to 95% by weight of an unsaturated carboxylic acid or its salt.

3. A process according to claim 1 or 2 wherein the water-soluble copolymer is prepared by polymerization in an aqueous medium at a pH value of at least 3.

4. A process according to claim 1 or 2 wherein the water-soluble copolymer is prepared by polymerizing the monomers in an aqueous medium at a pH below 3 and then adding an alkali into the polymerization mixture.

5. A process according to claim 1 wherein the water-soluble copolymer is derived from (a) at least 40% by weight of a nitrogen-containing compound having an ethylenically unsaturated bond and (b-2) not more than 60% by weight of an ethylenically unsaturated sulfonic acid or its salt.

6. A process according to claim 1 wherein the water-soluble copolymer is derived from (a) 45 to 95% by weight of a nitrogen-containing compound having an ethylenically unsaturated bond and (b-2) 5 to 55% by weight of an ethylenically unsaturated sulfonic acid or its salt.

7. A process according to claim 1 wherein the water-soluble copolymer is a terpolymer derived from (a) 5 to 95% by weight of a nitrogen-containing compound having an ethylenically unsaturated bond, (b-1) more than 5% but less than 95% by weight of an unsaturated carboxylic acid or its salt and (b-2) not more than 60% by weight of an ethylenically unsaturated sulfonic acid or its salt.

8. A process according to claim 7 wherein the amount of the (b-2) ethylenically unsaturated sulfonic acid or its salt is from 5 to 55% by weight based on the total of the compounds (a), (b-1) and (b-2).

9. A process according to claim 1 wherein the water-soluble copolymer is prepared in an aqueous medium by using a redox initiator.

10. A process according to claim 1 wherein the amount of the water-soluble copolymer is in the range of from 0.1 to 10 parts by weight based on 100 parts by weight of the radically polymerizable unsaturated monomer or monomers.

11. A process according to any of claims 1, 2, 7 or 8 wherein the unsaturated carboxylic acid has 3 to 8 carbon atoms.

12. A process according to any of claims 1, 5, 6, 7 or 8 wherein the ethylenically unsaturated sulfonic acid has 2 to 8 carbon atoms.

* * * * *